Oct. 11, 1960 — H. KRAUSE ET AL — 2,955,859
HOOD LATCH
Filed Dec. 24, 1956 — 10 Sheets-Sheet 2
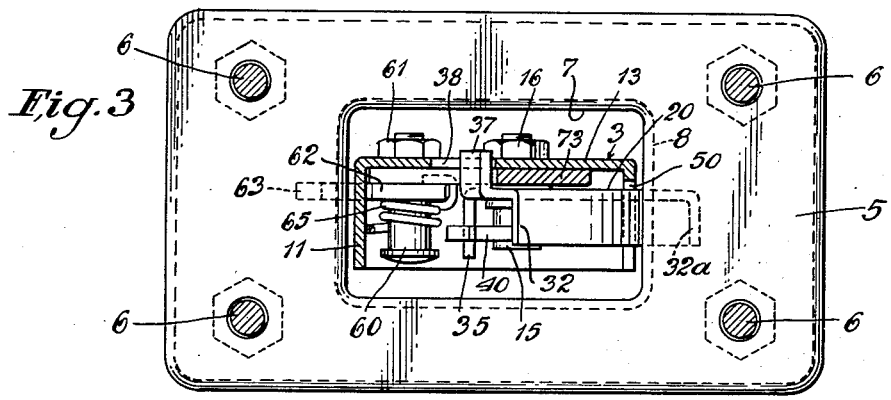
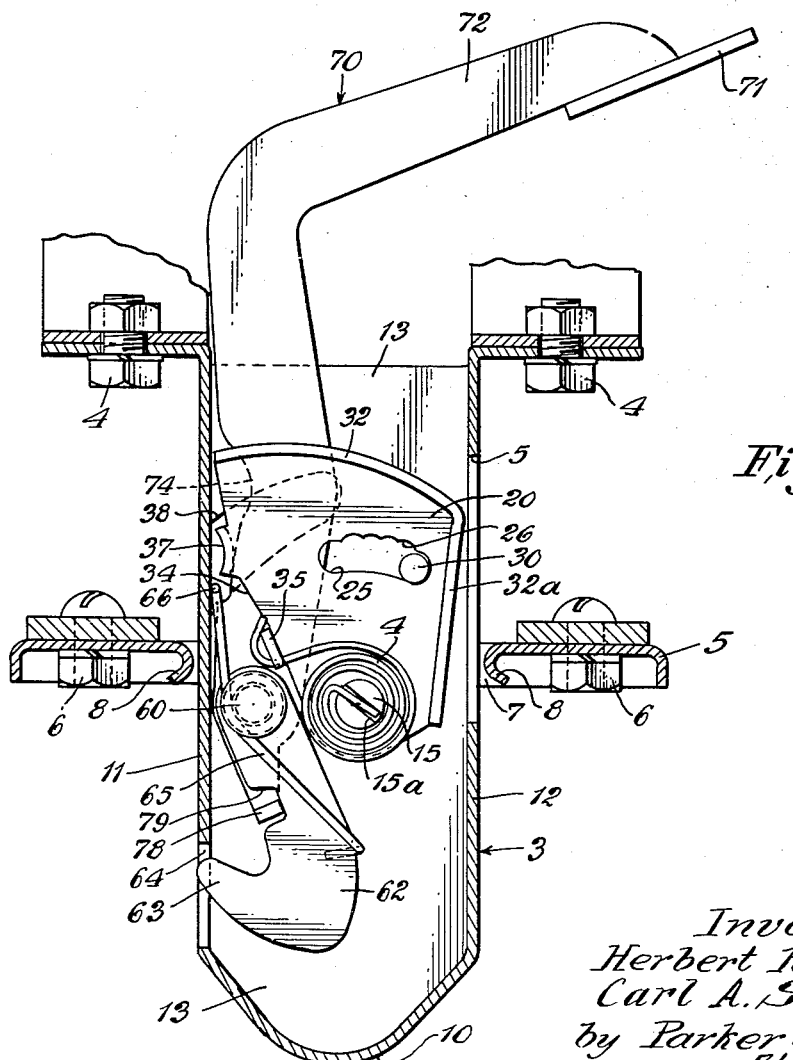
Inventor
Herbert Krause
Carl A. Sigel
by Parker & Carter
Attorneys Oct. 11, 1960
H. KRAUSE ET AL
2,955,859
HOOD LATCH
Filed Dec. 24, 1956
10 Sheets-Sheet 3
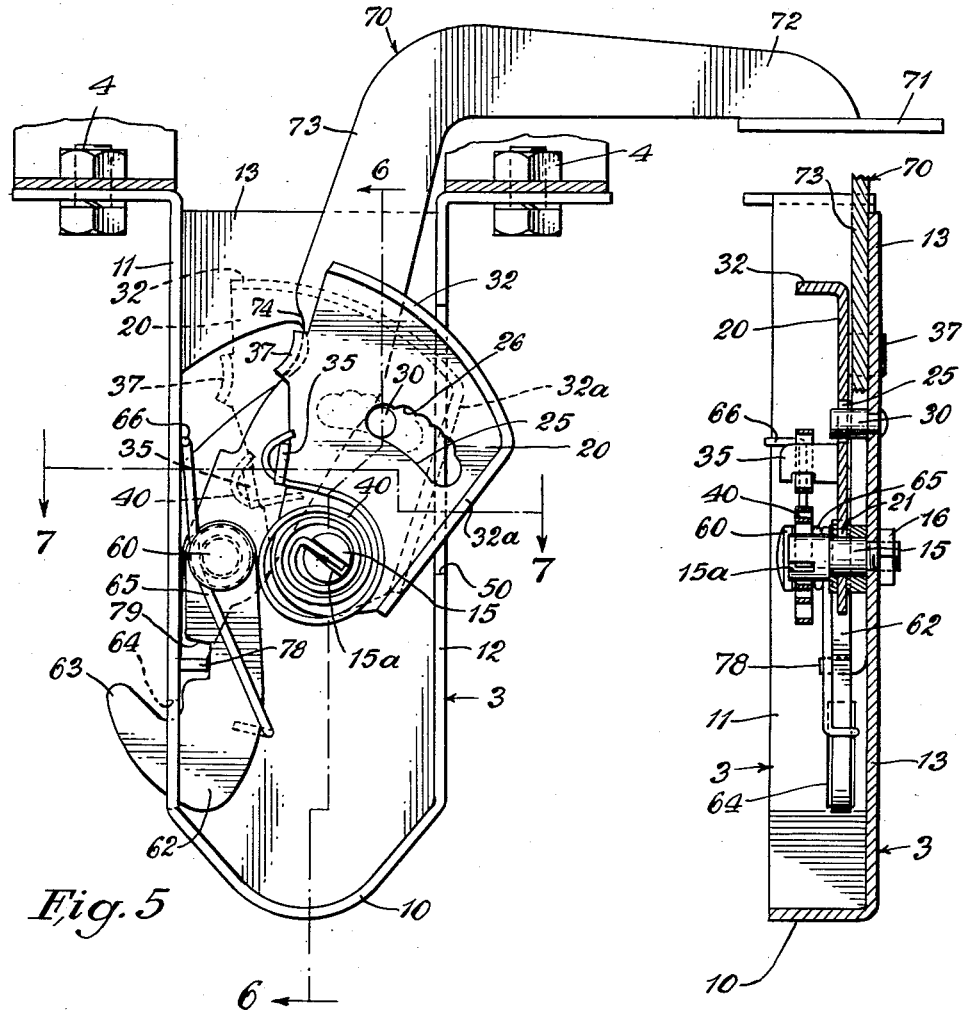
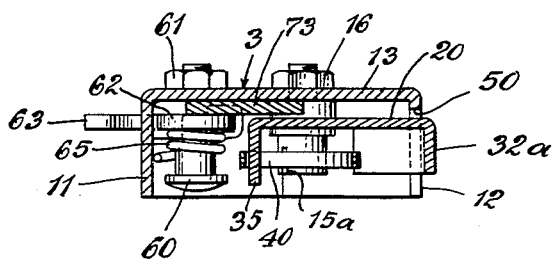
Inventor
Herbert Krause
Carl A. Sigel
by Parker & Carter
Attorneys

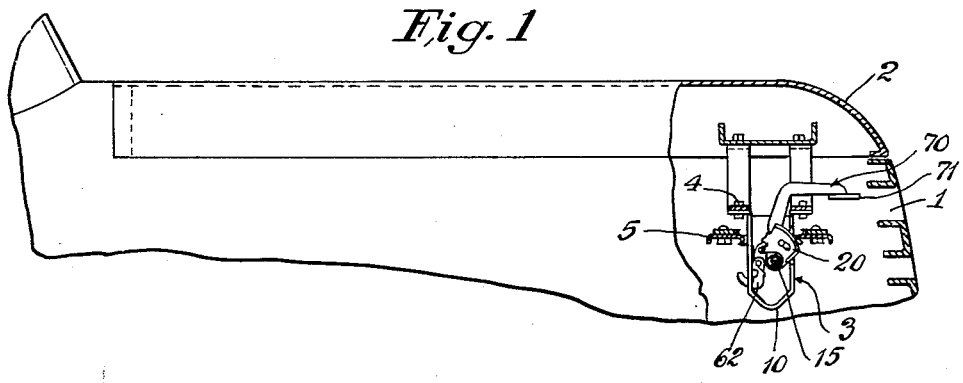

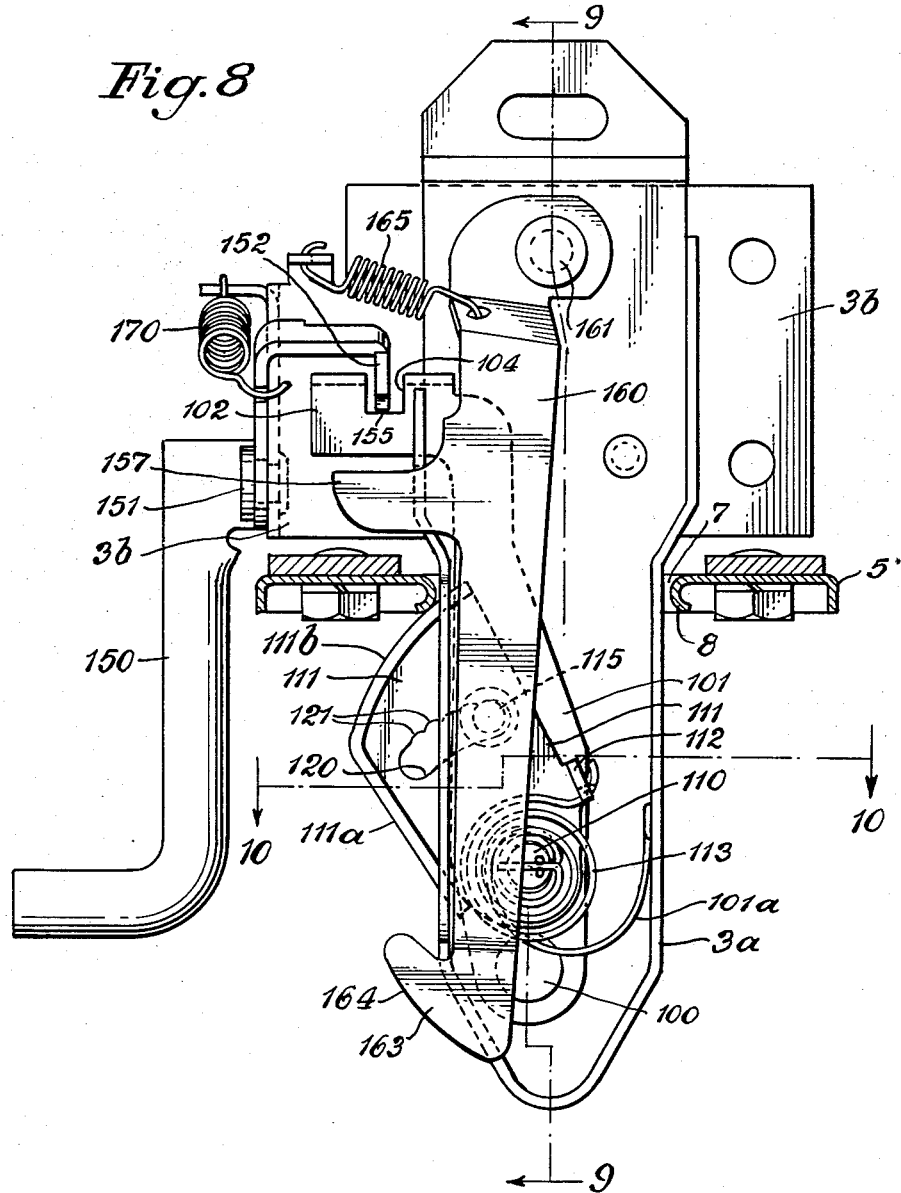

Oct. 11, 1960 H. KRAUSE ET AL 2,955,859
HOOD LATCH
Filed Dec. 24, 1956 10 Sheets-Sheet 5
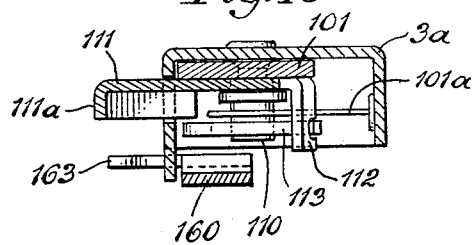
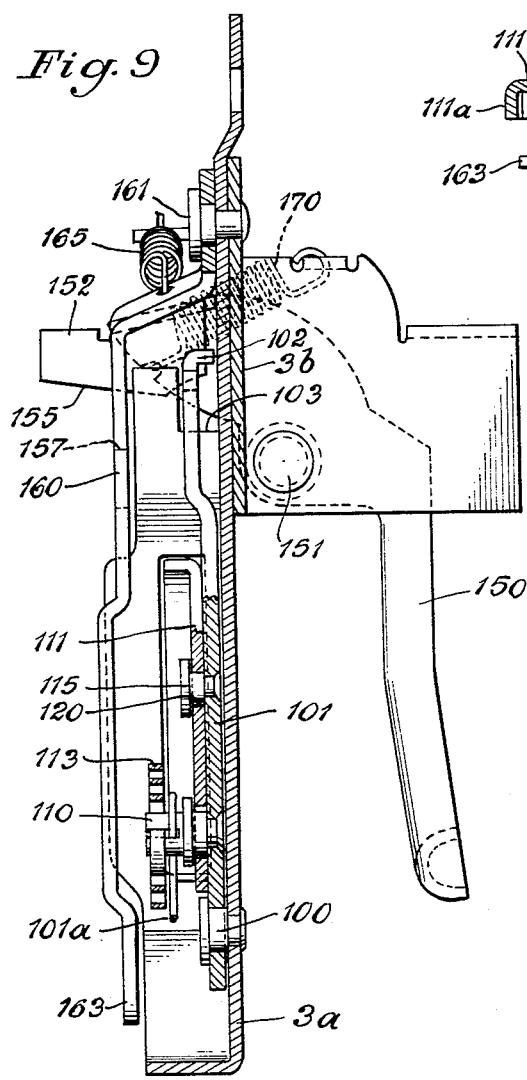
Inventor
Herbert Krause
Carl R. Sigel
by Parker & Carter
Attorneys

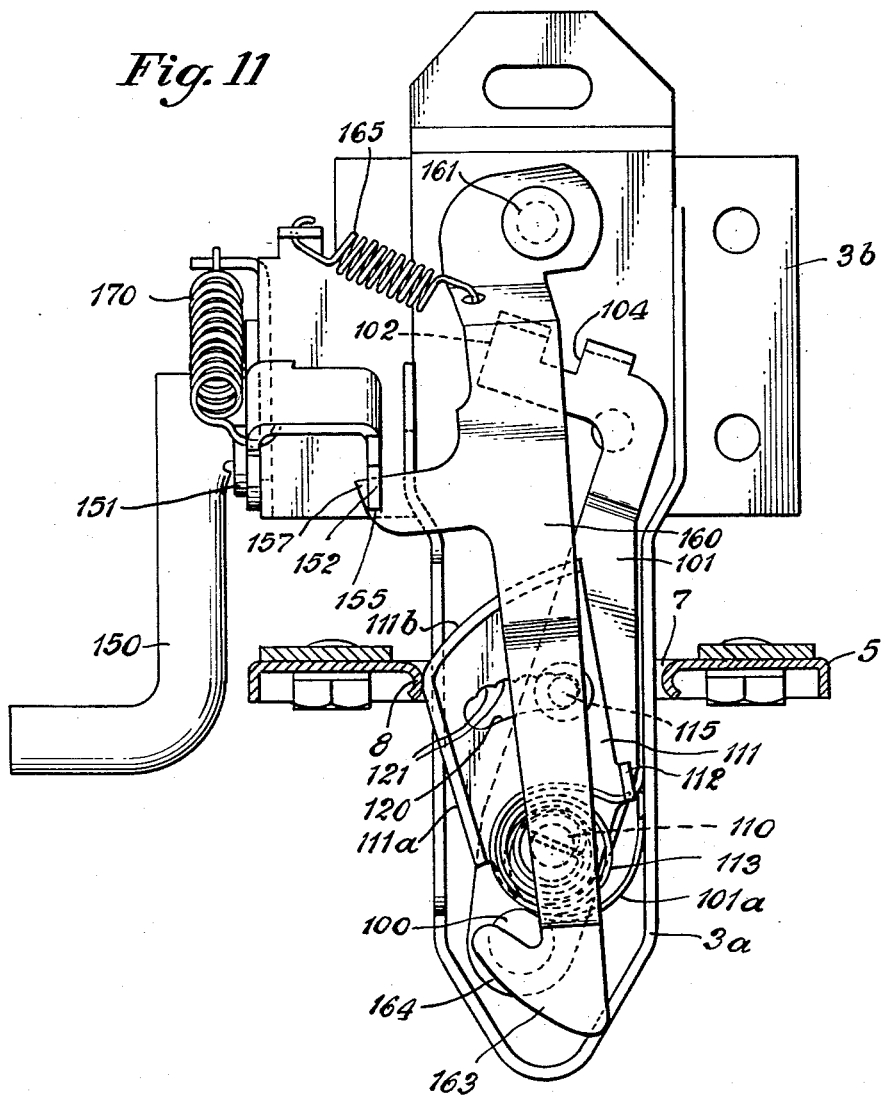

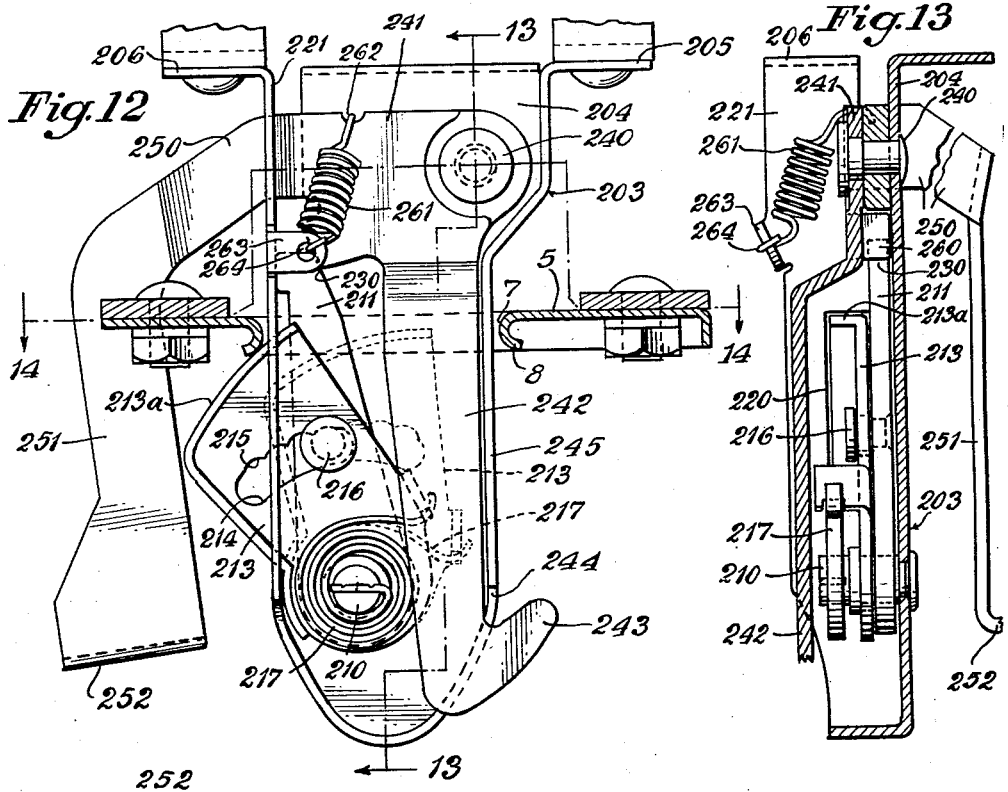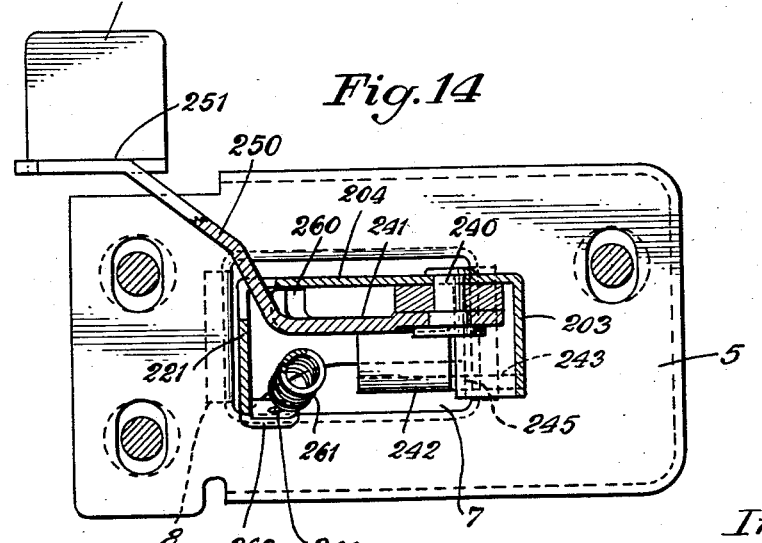

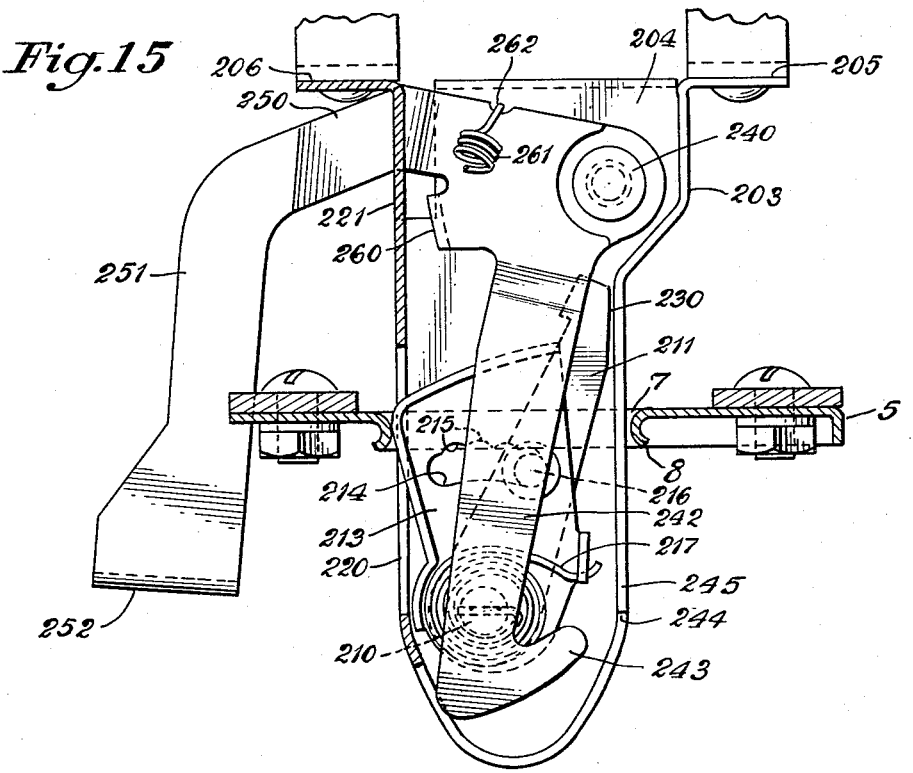

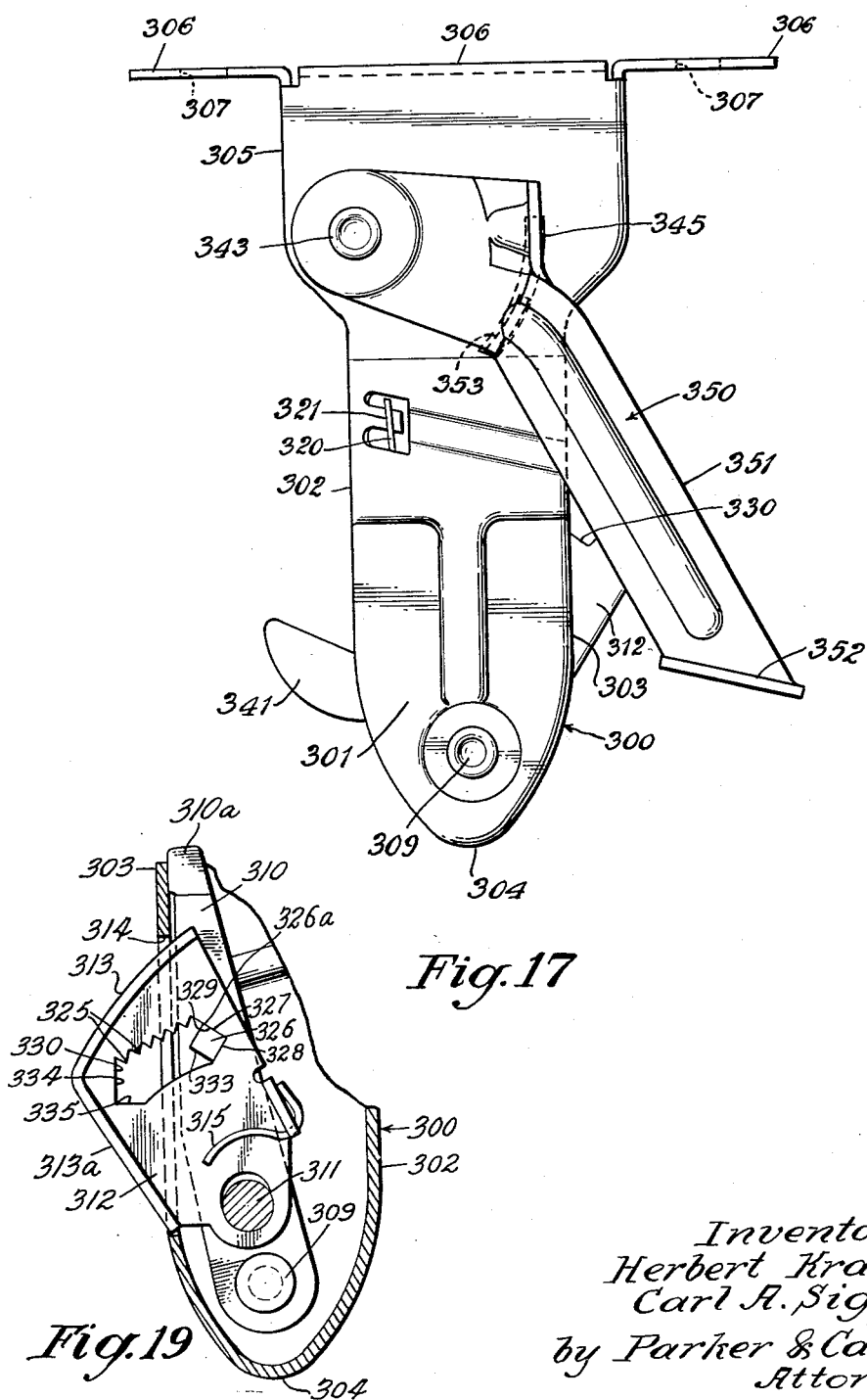

United States Patent Office 2,955,859
Patented Oct. 11, 1960

2,955,859

HOOD LATCH

Herbert Krause and Carl A. Sigel, Chicago, Ill., assignors to Chicago Forging and Manufacturing Company, Chicago, Ill., a corporation of Delaware Filed Dec. 24, 1956, Ser. No. 630,227

16 Claims. (Cl. 292—6)

This invention relates to latch mechanisms and has particular relation to a latch mechanism for use with vehicle hoods and closures therefor.

One purpose of the invention is to provide a latch mechanism which shall occupy a minimum of space but which shall yet be efficient and economical to manufacture.

Another purpose is to provide a latch mechanism employing a plunger and a plate apertured to receive the plunger wherein the latching mechanism is contained within the plunger itself.

Another purpose is to provide a latch mechanism wherein a tendency to separate the elements latched thereby is employed to further secure the elements in latched position.

Another purpose is to provide a latched mechanism employing a yielding member arranged to urge a latch element toward latching position and simultaneously to urge said latch element toward a position from which it may be easily moved toward unlatched position.

Another purpose is to provide a latch mechanism having a latch element which is both pivotally and slidably mounted on one member of said latch mechanism.

Another purpose is to provide a latch mechanism employing a plunger and a plate apertured to receive the plunger, said plunger having therewithin a main latch, a safety latch and a unitary lever for operating said main latch and said safety latch.

The present application is a continuation-in-part of application Serial Number 550,052 filed November 30, 1955, and entitled "Hood Latch," now abandoned. The application Serial Number 550,052 is a continuation-in-part of application Serial Number 516,136 filed June 17, 1955, and entitled "Hood Latch," now abandoned.

Another purpose is to provide a hood latch assembly wherein the main latch element may be returned to nonlatching position by separating movement of the latched members.

Another purpose is to provide a latch assembly wherein unintended separating movement of the latched members causes the latch element to lock against movement toward nonlatching position.

Another purpose is to provide a latch assembly incorporating positive means for locking a main latch member in latching position in response to forces tending to separate the latch members.

Another purpose is to provide a keeper assembly in which a main latch, a safety latch and a unitary means therefor are movably mounted on said keeper.

Another purpose is to provide a latch assembly in which a keeper has attaching portions at one end thereof and carries at one side of said attaching portions, a main latch, a safety latch and control means for said latches.

Other purposes will appear from time to time in the course of the specification and claims.

We illustrate our invention more or less diagrammatically in the accompanying drawings, wherein:

Fig. 1 is a side view in partial cross-section and with parts broken away, illustrating the latch mechanism of our invention associated with a vehicle head and closure therefor.

Fig. 2 is a side view in partial cross-section and on an enlarged scale illustrating the latch mechanism.

Fig. 3 is a view taken on line 3—3 of Fig. 2.

Fig. 4 is a view similar to that of Fig. 2 and illustrating the latch mechanism in unlatched position.

Fig. 5 is a view similar to that of Figs. 2 and 4 and illustrating the parts in latching position.

Fig. 6 is a view taken on line 6—6 of Fig. 5.

Fig. 7 is a view taken on line 7—7 of Fig. 5.

Fig. 8 is a side view in partial corss-section illustrating a variant form of our invention;

Fig. 9 is a view taken on the line 9—9 of Fig. 8.

Fig. 10 is a view taken on the line 10—10 of Fig. 8.

Fig. 11 is a view similar to that of Fig. 8 but showing parts in nonlatching position.

Fig. 12 is a side illustration illustrating a variant form of our invention.

Fig. 13 is an end view in partial cross-section taken on the line 13—13 of Fig. 12.

Fig. 14 is a view in partial cross-section taken on the line 14—14 of Fig. 12.

Fig. 15 is a side illustration in partial cross-section illustrating the cross-section of Fig. 12 with the parts in a different position.

Fig. 17 is a view similar to that of Fig. 16 and illustrating the structure thereof.

Fig. 19 is a view taken on line 19—19 of Fig. 18.

Figures 16, 18:
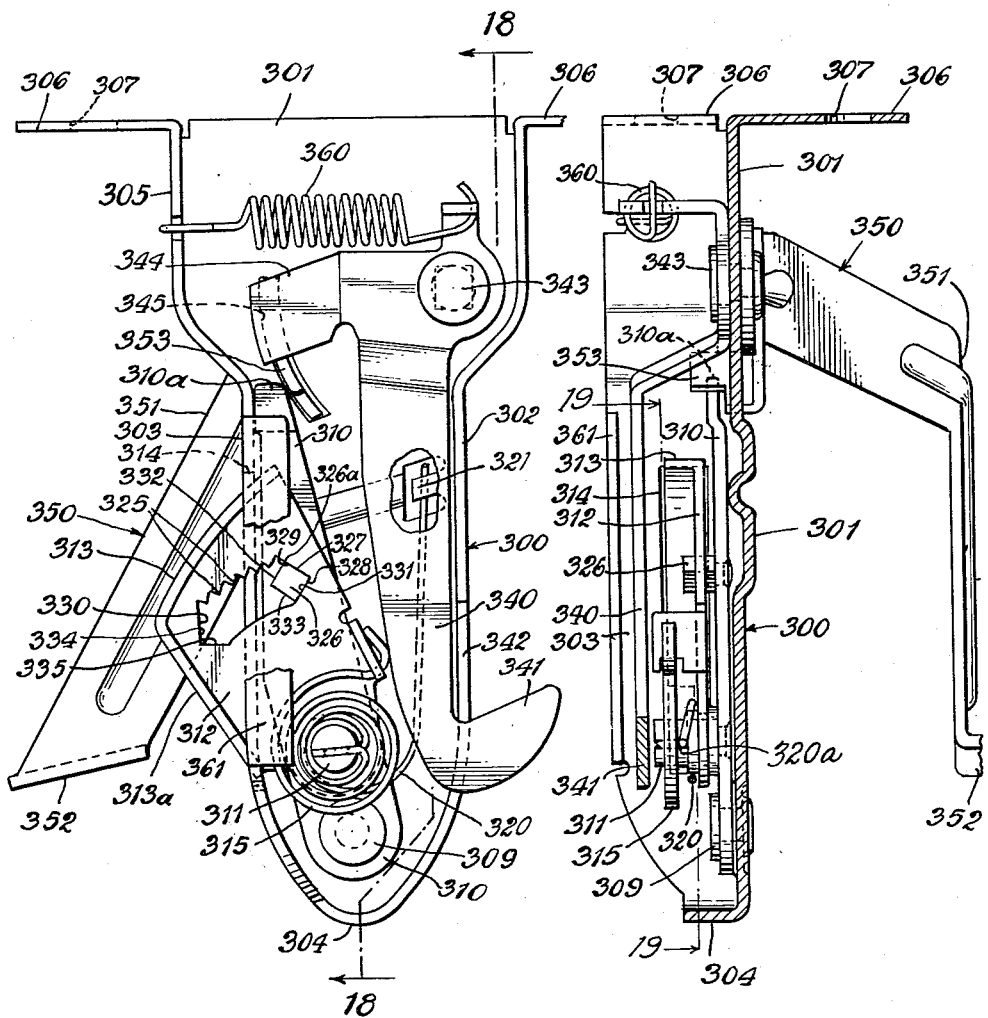
Fig. 16 is a view similar to that of Fig. 2 and illustrating a variant form of our invention.
Fig. 18 is a view taken on the line 18—18 of Fig. 16.

Like parts are indicated by like numerals throughout the specification and claims.

Referring now to the drawings and particularly to Figure 1 thereof, the numeral 1 generally indicates a hood of a vehicle and, for convenience, an automobile hood is illustrated. A closure for the hood 1 is indicated generally by the numeral 2. Referring also to Figure 2, the plunger 3 may be rigidly secured to either of the members 1, 2. As a matter of illustration, the plunger 3 is shown as being secured by the fasteners 4 to and depending from the closure 2. A plate may be secured to the opposite of the members 1, 2 and, in the drawings, is shown as connected by the fasteners 6 to the hood member 1. An aperture 7 is formed in the plate 5 in position to be penetrated by the plunger 3 when the members 1 and 2 are brought toward each other. The plate 5 may have downwardly curved portions 8 at opposite edges of the aperture 7, in alignment with the path travelled by the plunger 3 as it moves toward and through the plate 5, and the plunger 3 may have a generally convex or curved or conical outer end indicated generally at 10. It will be observed that the formation of the plunger end 10 and the curved plate portions 8 provide a guide to direct the plunger 3 through the aperture 7 even though the plunger, as it leaves the plate 5, may not be in direct alignment with the aperture 7.

As best seen in Figures 3, 6 and 7 the plunger 3 may be generally a three-sided substantially rectangularly formed member having a pair of opposed parallel forward and aft sides 11 and 12. While the plunger 3 is illustrated as having three sides, it will be understood that a fourth side wall corresponding to the wall 13 may be employed to join the opposite edges of the walls 11, 12 without departing from the nature and scope of my invention.

A pivot pin 15 may be fixed generally centrally of the plunger wall 13 and may, for example, be secured thereto by the fastener 16. As best seen in Figures 2 and 7, the pivot 15 extends inwardly from the wall 13 between the walls 11, 12. Slidably and pivotally mounted by the pivot 15 on the plunger wall 13 and between the walls 11, 12 is a latch element 20. The latch element 20 has the slot 21 surrounding the pivot pin 15 and extending when the latch element 20 is in unlatched position, such as is illustrated in Figure 4 in a path generally paralleling the walls 11, 12. The latch element 20 has generally centrally positioned thereon an arcuate slot 25, the arc of which may be considered as being formed by a radius extending from the center of the slot 21. The arcuate slot 25 has a scalloped or serrated longitudinal edge 26 and, as the parts are shown in the drawings, the edge 26 is the upper edge of the slot 25. A pin 30 is fixed on the plunger wall 13 and extends inwardly therefrom between the plunger walls 11, 12 and into or through the slot 25 in position to engage the opposed ends of the slot 25 and the serrations 26 when the latch element 20 is in one position, as illustrated in Figure 2. The latch element 20 has a generally arcuate upper edge, as the parts are shown in the drawings defined by the arcuate plate engaging the flange 32, which extends generally at right angles to the major plate portion of the latch element 20. A similar flange 32a defines a connecting edge of the latch 20, extending from one end of the flange 32 to a position adjacent the slot 21, the flange or boundary wall 32a being thus positionable to engage the plate 5 when the plunger 3 is moved through the aperture 7. An ear 35 may be inwardly bent from an edge of the latch 20 opposite the flange 32a to receive one end of a latch actuating coil spring 40, the opposite end of which may be located within a slot 15a in the pivot pin 15 about which the spring 40 is coiled. The ear 35 is positioned intermediate the slot 21 and the plate engaging wall 32 along the upper arcuate edge of the latch 20. Intermediate the ear 35 and the flange 32, and extending outwardly from the edge 34 of the latch, is an abutment 37 which, as may be best seen in Figures 2–5, extends through an arcuate slot 38 formed in the plunger wall 13 and extending in an upwardly inclined path from the wall 11 to a point generally intermediate the walls 11, 12 the arc of the slot 38 being formed generally about the center 15.

The wall 12 of the plunger 30 has an opening 50 therein of sufficient extension to permit a substantial portion of the latch element 20 to extend therethrough, the latch portion thus permitted to extend through the wall 12 being bounded by the plate engaging flanges or walls 32, 32a. It will be observed that the spring 40 is effective to urge the latch 20 through the aperture 50 and at the same time, because of the position of the ear 35 and pivot 15, and because of the elongated slot 21, the spring 40 is fully effective to urge the latch 20, at the same time both outwardly and upwardly.

A pivot rod 60 may be fixed on the plunger wall 13 as by the fastener 61, and may extend inwardly from the wall 13 between the walls 11, 12 and adjacent the wall 11 generally in the place of the pivot pin 15. Pivotally mounted about the center 60 is a safety latch member 62 having a hook portion 63 which is urged through an aperture 64 in the plunger wall 11 by the action of a spring 65, one end of which engages an edge of the safety latch 62 opposite the hook portion 63, the opposite end of the spring engaging the wall 11, as indicated at 66.

Pivotally mounted on the plate 13 about the pivot rod 60 is a latch actuating lever 70. The latch actuator 70 has a manually engageable handle portion 71 positioned at the outer end of a goose neck portion 72 which extends from an actuating portion 73 positioned within the plunger 3 and for movement between the walls 11, 12 of the plunger 3. The latch actuator portion 73 has a recessed edge 74 positioned to engage the abutment 37 on the latch 20 when the actuating lever is moved toward unlatching position. The opposite edge of the actuator portion 73 engages and is stopped by the pin 30. Since the latch actuating lever engages the abutment 37, and since the spring 40 is effective to urge the latch 20 with its abutment 37 toward latching position, it will be clear that the spring 40 is effective also to urge the latch actuating lever 70 toward non-latch-actuating position and against the stop 30. The latch actuating lever 70 has at its opposite end beyond the pivot 60 an abutment ear 78 positioned to engage a recess 79 in the safety latch 62 adjacent the hook portion 63 and opposite the safety latch edge engaged by the spring 65, whereby, as the actuating lever 70 is moved to release the main latch 20, the ear 78 will engage the safety latch 62 and the latch lever will therefore simultaneously move the main latch 20 and the safety latch 62 into non-latching position within the plunger 3 and between the opposed plunger sides 11, 12 as indicated in Figure 4.

Referring now to Figures 8–11, we illustrate a variant form of our invention wherein a plunger 3a is essentially the same as that illustrated in Figures 1–7. Pivotally mounted to the inner surface of the main wall of the plunger 3a adjacent its lower point, as at 100, is a latch carrying lever arm 101. The lever arm 101 extends substantially the length of the plunger end therewithin and carries at its upper end an outwardly extending projection or locking ear 102. The ear 102 extends through a slot 103 formed in one side wall of the plunger 3a adjacent its upper edge. The ear 102 itself carries a slot or recess 104, the purpose of which will appear herein below. As best seen in Figure 8, the slot 104 of the ear 102, when the lever 101 is at its maximum position as urged by a light spring 101a, is positioned outside the plunger 3a. Pivoted to the lever 101 adjacent and in alignment with the pivot 100, as at 110, is a latch element or latching cam 111. The cam 111 has an ear 112 and a relatively strong spring 113 has its opposite ends in engagement with the ear 112 and the first pivot 110. The latching element 111 has an enlarged aperture which surrounds the first pivot 110 to provide both a pivoting and sliding motion of the latch 111 in relation to the pivot 110, the purpose of which will appear hereinbelow.

A pin 115 is fastened upon the lever 101 and extends within the plunger 3a substantially above and in substantial alignment on the lever 101 with the pivots 110, 100. The latch element or cam 111 has an arcuate slot 120 formed therein and the pin 115 extends laterally through the slot 120. The slot 120 has its upper arcuate edge serrated as indicated at 121, the purpose of which will appear hereinbelow. Thus it will be seen that the lever or arm 101 carries the fixed pivot 110, latching cam 111, spring 113 and fixed pin 115. As best seen in Figure 11, rotation of the arm 101 about its pivot 100 in a clock-wise direction, as the parts are shown in the drawing, is effective to carry the latching cam 111 toward nonlatching position.

The latch element 111 is similar to that shown in Figures 1–7 and carries the inclined lower edge as the parts are shown in the drawing and the curved upper edge surface 111b. The surface 111b, like the surface 32 shown in Figures 1–7, is of such an arc, in comparison with the vertical or with the axis of the plunger 3a, that movement thereagainst of the curved edge 8 surrounding the apertures 7 in the latch plate 5 is normally effective, when unresisted, to cause the latch element 111 to move toward non-latching position. We provide, however, the unlatched opening, surrounding the fixed pivot 110, to permit a sliding movement of the latch element 111 on the arm 101. Thus, when the arm 101 is held against movement, as will appear hereinbelow, any unintended force tending to separate the hood closure from the hood, or other elements to be latched, will cause an initial downward sliding movement, as the parts are shown in the drawing of the latch element 111. This movement, however, brings the serrations 121 into engagement with the pin 115 and thus locks the latch element 111 against pivotal movement or against rotational movement about its pivot 110 toward nonlatching position. When, however, the latch arm 101 is unlocked and free to pivot about its pivot 100, the same motion of the edge 8 against the edge 111b, is effective to cause the arm 101 and latch element 111 to move toward nonlatching position as shown in Figure 11, i.e. toward a position within the plunger 3a. It will be observed that the spring 101a is of substantially less strength than that of the spring 113 and, that consequently, force exerted against the latch element 111 will be transmitted to the spring 113 to the arm 101 and that intended upward movement of a hood closure, such as the closure 2 shown in Figure 1, will, with only the relatively limited amount of force necessary to overcome the light spring 101a, result in the movement of the parts toward unlatched position.

In Figures 8–11, we illustrate the plunger 3a as being secured to an attaching plate 3b. It will be realized however that the upper portion of the plunger 3a could be formed in any suitable manner for attachment to a hood closure or a hood or other structure without departing from the nature and scope of our invention. Thus, while we illustrate a locking and release arm 150 as being rotatably mounted about a pivot 151 on the plate 3b, a similar releasing and locking member could be mounted upon a portion of the plunger 3a without departing from the nature and scope of our invention. The release arm 150 has a locking ear portion 152 which is movable into and out of engagement with the slot 104 in the ear 102 of the arm 101 when the ear is in its outermost position as shown in Figure 8. The lever 150 also carries a releasing abutment 155 which is movable into and out of engagement with a corresponding opposed abutment 157 which projects outwardly from the plunger 3a in the same direction adjacent and parallel with the ear or projection 102 of the arm 101. The safety latch 160 which carries the abutment 157 may extend throughout substantially the length of the plunger 3a and may be pivoted thereto and therewithin at a point adjacent the upper edge of the plunger 3a as indicated generally at 161. The safety latch 160 may have a hook portion 163 adjacent its lower end. As best seen in Figure 8, the hook portion 163 extends outwardly from the plunger 3a and carries an arcuate edge 164 for engagement with the edge 8 surrounding the aperture 7 in the plate 5 as the plunger 3a moves through the aperture 7. A yielding member 165 is secured at its opposite ends toward plate 3b and safety latch 160 to urge the safety latch toward latching position. A similar yielding member 170 is secured at its opposite ends to the plate 3b and lever 150 to urge the lever 150 toward non-operating position in relation to the safety latch 160 and toward locking position in relation to the arm member 101.

Referring now to Figures 12–15, the variant form of our invention illustrated therein comprises a keeper or plunger member 203 which has the general configuration of the keeper 3 or 3a with an enlarged upper segment 204 between a pair of oppositely directed attaching ears 205, 206.

Pivotally mounted on the plunger 203 as at 210 is a latch control arm 211 and a latch member 213.

It will be understood that the latch 213 conforms generally to the form illustrated in Figures 8–11, the latch 213, for example, having the generally arcuate slot 214 with its upper serrated edge 215 positioned for movement across a pin 216 fixed on the arm 211. A spring 217 has its opposite ends associated with latch 213 and plunger 203 to urge the latch 213 outwardly through a slot 220 in a side wall 221 of the keeper 203 and to urge arm 211, through latch 213, toward the wall 221. The upper end of the arm 211 terminates within the plunger 203 and carries an abutment portion 230.

Pivotally mounted on an inner surface of the keeper enlargement 204, as at 240, is a combination, integral safety latch and release lever generally indicated at 241. The member 241 may have an elongated safety latch arm 242 extending from the pivot 240 along the axis of and within the plunger 203. The arm 242 may have the safety-hook end portion 243 positioned to extend through a slot 244 in a side wall 245 of the plunger 203. Extending from the pivot 240 at an angle substantially perpendicular to the arm 242 is a release lever generally indicated at 250. The release lever may extend through the wall 221 of the plunger 203 and may have an angularly disposed outer end portion 251 terminating in a manually operable handle element 252. As best seen in Figure 12, the member 241 may take generally the shape of a U. The portions 240, 242 being substantially parallel legs of the U, the portion 250 constituting the base of the U and the pivot 240 being positioned adjacent the juncture of portions 250, 242.

Extending inwardly between the portions 250, 242 at substantially the juncture therebetween is an abutment portion 260 formed integrally with or otherwise secured for movement with the element 241. It will be clear from the drawings that abutment member 260 on member 241 extends generally radially from the axis of the pivot 240 and is dimensioned to contact the abutment 230 on latch control arm 211. A yielding member, which may comprise the spring 261 may have its opposite ends connected to the member 241 as at 262 and to an ear 263 on the plunger 203 as indicated at 264 to urge the member 241 toward the position illustrated in Figure 12.

Referring now to Figures 16–19 inclusive, the numeral 300 generally indicates a keeper member having the main wall 301 and a pair of spaced side walls 302, 303. The keeper member 300 has a forward reduced or pointed nose portion 304 and a somewhat enlarged base portion 305. Attaching ears or portions 306 extend outwardly from the end portion of the base 305 and may be suitably apertured as at 307 to provide for passage of suitable attaching means as illustrated, for example, at 4 in Figure 2.

Pivotally mounted, as at 309, on and within the keeper 300 is a latch supporting lever or arm 310. Pivotally mounted on the lever 310, as at 311, is a main latch element 312. The element 312 in overall configuration is similar to that illustrated in Figures 1–15 and has the camming or curved latching surface 313 positioned for movement through a slot 314 in side wall 303 of the keeper 300. A somewhat massive spring 315 has one end secured at the pivot 311 and its opposite end in engagement with the latch 312. It will be understood that the latch 312 has an elliptical or elongated opening surrounding the pin 311 to permit movement longitudinally along the lever 310 as well as pivotal movement therein about the pivot 311 and that the spring 315 is effective to urge the latch 312 outwardly along the lever 310 as well as rotatably outwardly through the slot 314. A second yielding member or spring 320, of less power than that of member 315, has its opposite ends in engagement with the lever 310 as at 320a and with the keeper 300 as at 321 to urge the lever 310 against the side wall 303 and thus into position allowing maximum penetration of the latch 312 through the slot 314.

An opening or slot 330 is formed in the latch 312 and may, for example, be somewhat arcuate in direction, the arc of the slot lying substantially in the plane of an arc about the pivot 311. The edge of the slot furthest removed from the pivot 311 has formed therein teeth 325. A pin 326 is fixed on the lever 310 and extends through the slot 330. The pin 326 has a generally conical or pointed upper surface for engagement with the ratchet or teeth 325. The pin 326 may, for example, be square in lateral cross-section, thus providing a pair of converging end-surfaces 327, 328 on one side thereof for engagement between converging edges 329, 331 of the slot 330 at one end thereof and providing converging abutment surfaces 332, 333 for engagement by the converging end-edges 334, 335 at the opposite end of the slot 330.

Rotatably mounted within the keeper 300 is a safety latch member 340 having a latching end portion 341 extending through a slot 342 in the wall 302 of the keeper 300. The safety latch 340 has formed integrally therewith and extending outwardly therefrom adjacent its pivot 343, an operating or actuating abutment or ear 344. It will be observed that the ear 344 extends toward and terminates at a point spaced slightly above the end portion 310a of the lever 310, the abutment 344 overlying a portion of an arcuate slot 345 formed in the wall 301 of the keeper 300. Rotatably mounted on the outer surface of the wall 301 and, for example, about the pivot 343, is an operating handle element 350. The lever portion 351 extending substantially parallel with the keeper 300 and at substantially the same direction from the attaching portions 306 as does the keeper 300. The arm or lever 351 terminates in a manually operable portion 352. The portion 351 may have an operating abutment or ear portion 353 extending through the slot 345 in position to engage the safety latch abutment 344 and the end abutment 310a of the lever 310. As the parts are shown in the drawings, the abutment 353 engages an under surface or edge of the abutment 344 and an inner surface or edge of the abutment 310a.

It will be realized that, whereas we have described and claimed a practical and operative device, nevertheless, many changes may be made in the size, shape, number and disposition of parts without departing from the spirit of our invention. The description and drawings should, therefore, be taken as in a broad sense illustrative or diagrammatic, rather than as limited to our precise showing.

The use and operation of our invention are as follows:

Considering the plunger 12 as being attached to the hood closure 2 and the aperture plate 5 as being attached to the hood 1, as the hood closure 2 is brought downwardly upon the hood 1, the forward end 10 of the plunger 12 enters the aperture 7 in the plate 5. The arcuate outer edge of the safety latch 63 which extends outwardly from one edge of the plunger 12 rides upon the plate 5 about the aperture 7 and is forced inwardly by the downward motion of the plunger 12. As the plunger 12 passes further through the aperture 7, the spring 65 is effective to return the hook 63 of the safety latch 62 outwardly through the aperture 64 in the plunger 12 into the position illustrated for example, in Figure 2. Continued movement of the plunger 12 downwardly through the aperture 7 causes the outwardly upwardly inclined edge 32a of the main latch 20 to ride along the plate 5 about the aperture 7 thus forcing the latch 20 into a position within the plunger 12 similar to that illustrated in Figure 4. As the plunger passes further through the aperture 7 the upper arcuate edge 32 of the main latch 20 is caused to ride along the lower outwardly bent flange 8 about the aperture 7 in the plate 5 and the latch 20 is thus permitted to return through the aperture 50 in the plunger 12 in response to the urging of the main latch spring 40. Thereafter any tendency or force tending to separate the hood closure 2 and the hood 1 causes the flange 8 about the aperture 7 in the plate 5 and the arcuate edge or flange 32 of the main latch 20 to be pressed together and thus the serrations 26 in the slot 25 of the main latch 20 are forced downwardly into engagement with the pin 30 on the plunger 12, the slot 21 in the main latch 20 being formed to permit upward and downward movement in an inclined plane on the part of the main latch 20 when the latch is in latching position. Thus any force tending to separate the hood closure 2 and hood 1 serves to lock the main latch 20 in locking position. As is well known a compressive member, such as a spring, is normally provided with automobile hoods and closures, for example, and arranged to exert a yielding force against the closure to urge it toward open position.

It will be observed that the main latch 20 is effective to secure the hood closure 2 on the hood 1 at a variety of positions of the main latch 20 and that, from the time the plunger has passed through the aperture a predetermined distance, the main latch 20 is, at all times thereafter, in engagement with the flange 8 of the plate 5. Thus there is no opportunity for any play or slack to occur between the hood closure 2 and hood 1. If, for example, the closure 2 is brought closer to the hood 1 from the position illustrated, for example, in Figure 2, it is believed clear that the latch 20 would thus be forced outward a greater distance through the aperture 50 in the plunger 12, the arcuate flange 32 of the main latch 20 continuing in engagement with the flange 8 of the plate 5, the spring 40 being effective to urge the main latch 20 both upwardly to disengage the serration 26 from the pin 30 and outwardly to extend the main latch 20 a greater distance outwardly from the plunger 12.

When the operator desires to release the hood latch it is necessary only that he raise upwardly on the handle 71 of the latch actuating lever 70 thus rotating the actuating lever in a counterclockwise direction about its pivot 60. The abutment recess 74 of the actuating lever 70 thereupon engages the abutment 37 on the main latch 20 to move the main latch inwardly within the plunger 12 and the abutment 78 on the stub end of the actuating lever 70 beyond the pivot 60 engages the recess 79 in the safety latch 62 to similarly move the safety latch inwardly within the plunger 12, the main latch 20 and safety latch 62 being simultaneously thereby moved into the position illustrated in Figure 4. Continued upward movement of the actuating lever handle 71 causes a raising of the hood closure 2, the plunger 12 being free to move upwardly through the aperture 7 and the plate 5 since the main latch and safety latch are held within the plunger 12.

In the device of Figures 8–11, movement of the plunger 3a through the aperture 7 causes engagement of the plate 5 with the safety latch hook 163. Continued movement of the plunger causes the safety latch to move into nonlatching position against the relatively light resistance of the yielding member 165. Continued movement of the plunger brings plate 5 into engagement with the inclined edge 111a of the latching cam or lever 111. Continued movement of the plunger causes inward rotation of the member 111 about its pivot 110 against the substantial resistance of the spring 113. As the plate 5 passes the point to which the upper and lower edges 111a, 111b, of the member 111 meet, the spring 113 is effective to move the member 111 outwardly toward latching position. From this point on the plate 5 is in latching engagement with the plunger 3a at any point along the curved edge 111b. Thus is provided a latch structure which will permit a wide tolerance in relative position of a hood and hood closure, for example. As spare members or shock absorbing members, normally utilized between such members to be latched begin to wear and the members to be latched are consequently brought closer together, the latch element 111 is simply moved further outwardly by the spring 113 to bring a higher portion of the edge 111b into an engagement with the plate 5. As above indicated, when the parts are in the position shown in Figure 8, any force tending to separate the latch members simply cause downward movement of the latch element 111 and a consequent locking engagement between the serrations 121 and the pin 115.

To release the device illustrated in Figures 8–11 the operator merely rotates the lever 150. This brings the abutments 155, 157 into engagement to move the safety latch 160 out of latching position as illustrated in Figure 11. In order for the abutment 155 to contact the abutment 157, the lever 150 is rotated a distance sufficient to bring its locking ear 152 out of engagement with the ear or projection 102 on the arm 101. Thereafter the operator need only to continue rotational pressure on the lever 150 which, through the middle plate 3b, results in upward movement of a closure 2 such as the closure illustrated in Figure 1. Movement of the closure 2 or similar structure, away from the structure to which it was latched, causes inward movement of the latch element 111 through the middle of downwardly directed force exerted by the plate 5 along the curved cam edge of the member 111. Since, however, the spring 113 is substantially stronger than the spring 101a and since the arm 101 is unlocked, the pressure of the plate 5 against the edge 111b may be relatively slight while nonetheless effective to cause inward movement of the arm 101 and element 111.

In the operation of the device illustrated in Figures 12–15 the abutment 260 serves to lock or position the latch control arm 211 in latch-holding position as illustrated in Figure 12. Pressure of a latch plate 5, with which my device is designed for use, against the cam surface 213a of the latch 213 causes engagement of the serrations 215 with the pin 216. Since the pin 216 is fixed on the arm 211 and the arm 211 is in turn held by the abutment 260, the latch 213 is effectively locked against unintentional release.

When the operator desires to release the latching mechanism illustrated in Figures 12–15, it is necessary only that he grasp the handle element 252 and raise upwardly, as the parts are shown in Figures 2–15. This action rotates the abutment 260 out of engagement with and out of the path of the abutment 230. This action also simultaneously rotates the safety hook 243 inwardly through the slot 244 to a position within the plunger 203 and therefore out of any position in which it might engage a portion of the vehicle. Since the member 241 is pivotally mounted on the plunger itself, continued movement of the handle 252 in the same direction causes the cam surface 213a to be further pressed against the latch plate with which it cooperates. The serrations 215 remain engaged with the pin 216. Since, however, the abutment 260 is no longer in the path of the arm 211, pressure of the cam surface 213a and latch plate 5 causes inward movement of the members 211, 216, 213 to move the latch 213 out of latching position.

As soon as the entire cam surface 213a has passed through the aperture of the latch plate with which it is associated, the strong spring 217 is effective to snap the latch 213 back through the slot 220 and return it to its latching position. Similarly the spring 217 is effective to move the latch 213 slightly upwardly, as the parts are shown in the drawings, the latch 213 having an elongated slot surrounding the pivot 210 in the manner described with relation to the prior figures. The arm 211 is similarly returned to the position illustrated in Figure 12. The spring 261 is effective to return the member 241 to the position illustrated in Figure 12.

With respect to the form illustrated in Figures 16–18, penetration of the keeper assembly through a keeper receiving aperture in a latch plate initially causes movement inwardly of the keeper 300 of both the safety latch 340 and main latch 312. As these latches pass through the aperture, they are moved outwardly, the safety latch through the action of a separate spring 360 secured at its opposite ends to the keeper 300 and safety latch 340 and the main latch through the action of spring 315. The inclined main latch edge portion 313a engages the keeper-receiving plate and is forced thereby upwardly inwardly of the keeper 300 thus maintaining the teeth 325 and locking segment 326a out of engagement. It should be observed that the spring 360 urges the abutment 344 into constant engagement with the abutment 353 and thereby serves to urge the safety latch toward latching position and the operating or control lever toward non-releasing and main latch locking position. The wall 303 has an inwardly directed flange portion 361 serving to protect the mechanism within the keeper 300. After the latching edge 313 is in engagement with a latching plate, forces tending to separate the latch elements such as a hood and hood closure exert a force against the latch 312 tending to move it along the latch supporting lever 310 toward the pivot 311, the elongated opening in the latch 312 being provided for this purpose. Such movement of the latch 312 brings the teeth 325 into engagement with the teeth engaging portion 326a of the pin 326 thus providing a positive lock against inward movement of the latch 312 about its pivot 311. Since the lever 310 is held in its outermost position, as shown in Figure 16, by the dual-functioning abutment 353 on the releasing lever 350, the latch 312 is prevented from movement toward nonlatching position.

When the operator desires to release the hood latch assembly shown in Figures 16–18, it is necessary only that the operator raise upwardly on the manually operable handle portion 352. This action moves the abutment 353 within the slot 345 to move first the safety latch 340 out of latching position through the medium of abutment 344 with which abutment 353 is constantly in engagement. Continued rotation of the lever 350 moves the abutment 353 out of the path of the abutment 310a on lever 310 and thus uncovers lever 310, freeing it for rotation about its pivot 309 and inwardly of the keeper 300. Thus, while the latch 312 is held against rotation with respect to lever 310 because of the engagement of the latch 312 with the keeper receiving plate, release of the lever 310 permits unitary movement of the lever 310 and latch 312, against the relatively weak action of the spring 320, toward latch releasing position. The movement of lever 310 and latch 312 together inwardly of the keeper 300 is produced by the upward motion of the keeper 300 in response to raising of the lever 350 and the engagement of the keeper receiving plate with the arcuate or camming latch edge 313.

We claim:

1. For use with an automobile hood latch structure, a plunger, a main latch pivotally and slidably mounted within said plunger, said plunger having yielding means therein and secured to said plunger and latch for simultaneously urging said main latch about its pivot outwardly from and longitudinally along said plunger, said latch having an arcuate slot traversing the path of longitudinal movement of said latch along said plunger, a pin fixed on said plunger and extending laterally through said slot, said slot having a serrated edge positioned to engage said pin in response to movement of said latch along said plunger, an apertured plate, the aperture in said plate being sufficient to permit the passage therethrough of said plunger, said latch having a surface positioned to engage said plate adjacent said aperture after said plunger has passed a predetermined distance therethrough, the engagement of said latch portion with said plate being at a point beyond said slot serrations from the pivot of said latch whereby said engagement is effective to urge said serrations into engagement with said pin.

2. For use with an automobile hood latch structure, a generally rectilinear plunger, a main latch mounted within said plunger for simultaneous pivotal and linear movement therewithin, said plunger being apertured to permit said main latch to extend outwardly at least partially therethrough, yielding means in said plunger for urging said main latch toward said outwardly extending position, a safety latch pivotally mounted within said plunger, said plunger being apertured at a point spaced along said plunger from said first named aperture to permit said safety latch to extend at least partially outwardly from said plunger, yielding means within said plunger for urging said safety latch toward said outwardly extending position and means for moving said main latch and said safety latch toward positions wholly within said plunger including an actuating lever pivotally mounted within said plunger and having a first surface positioned to engage said safety latch, said actuating lever having a manually engageable portion extending outwardly from said plunger, said actuating lever having a second portion positioned to engage said main latch at a point thereon, said second portion being positioned between the point at which said main latch is mounted on said plunger and said main latch engagement point whereby said main latch is moved simultaneously about its pivot and linearly of said plunger in response to movement of said actuating lever.

3. In an automobile hood latch structure a plate, an aperture in said plate, a plunger adapted to penetrate said aperture, a main latch pivotally and slidably mounted on said plunger for rotation on and longitudinally slidable movement along said plunger, means for locking said main latch in latched position in response to movement of said plunger outwardly from said aperture, said means including a slot in said main latch said slot being positioned transversely of the path of longitudinal slidable movement of said latch on said plunger, a pin extending laterally through said slot and fixed on said plunger, said slot having a serrated edge positioned between said plate and said pin when said latch is in latching position relative to said plate whereby outward movement of said plunger causes said plate to urge said main latch along said plunger in a direction away from said plate and thus to urge said serrated edge toward engagement with said pin to lock said main latch in latch position, and against rotation about its pivot toward nonlatched position.

4. In a latch assembly, a latch plate having an aperture therein, a plunger formed and adapted to penetrate said aperture, a main latch supporting lever pivotally mounted within said plunger, a main latch pivotally and slidably mounted on said lever, yielding means secured to said lever and said main latch and effective to urge said main latch rotatably outwardly from said lever and said plunger and slidably along said plunger, a second yielding means, said second yielding means being secured to said lever and said plunger and effective to urge said lever in the direction of rotation toward which said main latch is urged by said first named yielding means.

5. In a keeper assembly, an elongated keeper member, an attaching portion at one end of said keeper member, a main latch supporting member pivotally mounted in said keeper, a main latch pivotally and slidably mounted on said supporting member for rotation through a wall of said keeper, a safety latch pivotally mounted in said keeper and having a portion positioned for rotation through a wall of said keeper, said main latch and safety latch portion being spaced from said attaching portion and a locking and release member pivotally mounted on said keeper adjacent said attaching portion and extending along said keeper in a direction away from said attaching portion, said locking and release member having an abutment portion extending through a wall of said keeper for simultaneous engagement with said safety latch and said supporting lever when said safety latch and main latch are in latching position.

6. A latch assembly adapted for cooperation with a latch plate having a plunger receiving aperture therein including an elongated plunger assembly adapted to be received within the aperture, said assembly including a main frame having a lever rotatably mounted thereon, a main latching member mounted on the lever for rotational and longitudinal movement about and along the lever, releasable coupling means for coupling the main latching member to the lever in a first position of the lever and member and for uncoupling the member and lever in a second position, first resilient means for urging the member and lever to the uncoupled position and simultaneously urging the member outwardly from the plunger assembly into latching position, second resilient means for urging the lever outwardly, and locking and releasing means for locking the lever against the main frame, and means for moving the locking and releasing means out of locking engagement with the lever whereby engagement of the main latching member with the edge of the aperture is effective to move the coupled lever and member inwardly toward the plunger and out of latching position.

7. The latch assembly of claim 6 wherein the locking and releasing means includes a locking dog operated by a manually operable handle and movable into a positive engaging position with the lever for preventing inward rotation of the lever, and third resilient means secured to an auxiliary member pivoted to the plunger, said auxiliary member and third resilient member holding the locking dog in positive, lever engaging position.

8. The latch assembly of claim 7 further including a safety latching member mounted for pivotable movement on the plunger in response to pivotable movement of the auxiliary member.

9. For use with an automobile hood latch structure, a plunger, a main latch pivotally and slidably mounted within said plunger, said plunger having yielding means therein and secured to said plunger and latch for simultaneously urging said main latch about its pivot outwardly from and along said plunger, said latch having an arcuate slot traversing the path of movement of said latch along said plunger, a pin fixed on said plunger and extending laterally through said slot, said slot having a serrated edge positioned to engage said pin in response to movement of said latch alongside plunger, an apertured plate, the aperture in said plate being sufficient to permit the passage therethrough of said plunger, said latch having a surface positioned to engage said plate adjacent said aperture after said plunger has passed a predetermined distance therethrough, the engagement of said latch portion with said plate being at a point beyond said slot serrations from the pivot of said latch whereby said engagement is effective to urge said serrations into engagement with said pin.

10. For use with an automobile hood latch structure, a generally rectilinear plunger, a main latch mounted within said plunger for simultaneous pivotal and linear movement therewithin, said plunger being apertured to permit said main latch to extend outwardly at least partially therethrough, yielding means in said plunger for urging said main latch toward said outwardly extending position, a safety latch pivotally mounted within said plunger, said plunger being apertured at a point spaced along said plunger from said first named aperture to permit said safety latch to extend at least partially outwardly from said plunger, yielding means within said plunger for urging said safety latch toward said outwardly extending position and means for moving said main latch and said safety latch toward positions wholly within said plunger including an actuating lever pivotally mounted within said plunger and having a first surface positioned to engage asid safety latch, said actuating lever having a manually engageable portion extending outwardly from said plunger, said actuating lever having a second portion positioned to engage said main latch at a point thereon, said second portion being positioned between the point at which said main latch is mounted on said plunger and said main latch engagement point whereby said main latch is moved simultaneously about its pivot and linearly of said plunger in response to movement of said actuating lever.

11. In an automobile hood latch structure a plate, an aperture in said plate, a plunger adapted to penetrate said aperture, a main latch pivotally and slidably mounted on said plunger, means for locking said main latch in latched position in response to movement of said plunger outwardly from said aperture, said means including a slot in said main latch, said slot being positioned transversely of the path of slidable movement of said main latch, a pin extending laterally through said slot and fixed on said plunger, said slot having a serrated edge positioned between said plate and said pin when said latch is in latching position relative to said plate whereby outward movement of said plunger causes said plate to urge said main latch along said plunger in a direction away from said plate and thus to urge said serrated edge toward engagement with said pin to lock said main latch in latched position, and against rotation about its pivot toward non-latched positions.

12. In a latch assembly, a latch plate having an aperture therein, a plunger formed and adapted to penetrate said aperture, a latch control member pivotally mounted on and within said plunger, a latch element pivotally and slidably mounted entirely on said control member and yielding means connected to said latch element and said control member and positioned to urge said latch element about its pivot on said control member and outwardly from said plunger toward a position of engagement with said plate upon penetration of said aperture by said plunger.

13. The structure of claim 12 characterized by and including a safety latch pivotally mounted on said plunger and having a portion yieldingly urged outwardly from said plunger toward a position to engage said plate and manually operable means for moving said safety latch toward non-latching position, said last named means having a portion movable into and out of engagement with said latch control member to prevent movement of said latch control member.

14. The structure of claim 12 characterized by and including lock means on said latch element and said latch control member effective in response to engagement of said latch element with said plate to lock said latch element and said latch control member against relative rotation therebetween.

15. In a latch assembly, a plunger, a latch control arm pivotally mounted on said plunger for movement between latch-applying and latch-releasing positions, a latch element pivotally and slidably mounted on said latch control arm, a safety latch, operating lever means for operating said safety latch, said operating lever being pivotally mounted on said plunger, stop means on said plunger positioned to limit the movement of said operating lever in one direction, abutment portions on said latch control arm and said operating lever, yielding means positioned to urge said abutment portions into contact with each other to prevent movement of said latch control arm toward latch-releasing position when said operating lever is in position against said stop means.

16. For use with an automobile hood latch structure, a plunger, a main latch pivotally and slidably mounted within said plunger, said plunger having yielding means therein and secured to said plunger and latch for simultaneously urging said main latch about its pivot outwardly from and along said plunger, said latch having an arcuate slot traversing the path of movement of said latch along said plunger, a pin operatively connected to the plunger and extending laterally through said slot, said slot having a serrated edge positioned to engage said pin in response to movement of said latch along said plunger, an apertured plate, the aperture in said plate being sufficient to permit the passage therethrough of said plunger, said latch having a surface positioned to engage said plate adjacent said aperture after said plunger has passed a predetermined distance therethrough, the engagement of said latch portion with said plate being at a point beyond said slot serrations from the pivot of said latch whereby said engagement is effective to urge said serrations into engagement with said pin.

References Cited in the file of this patent
UNITED STATES PATENTS

| | | |
|---|---|---|
| 2,636,765 | Dall | Apr. 28, 1953 |
| 2,698,762 | Dall | Jan. 4, 1955 |
| 2,793,061 | Dall | May 21, 1957 |
| 2,797,116 | Jaster | June 25, 1957 |